Figure 1:
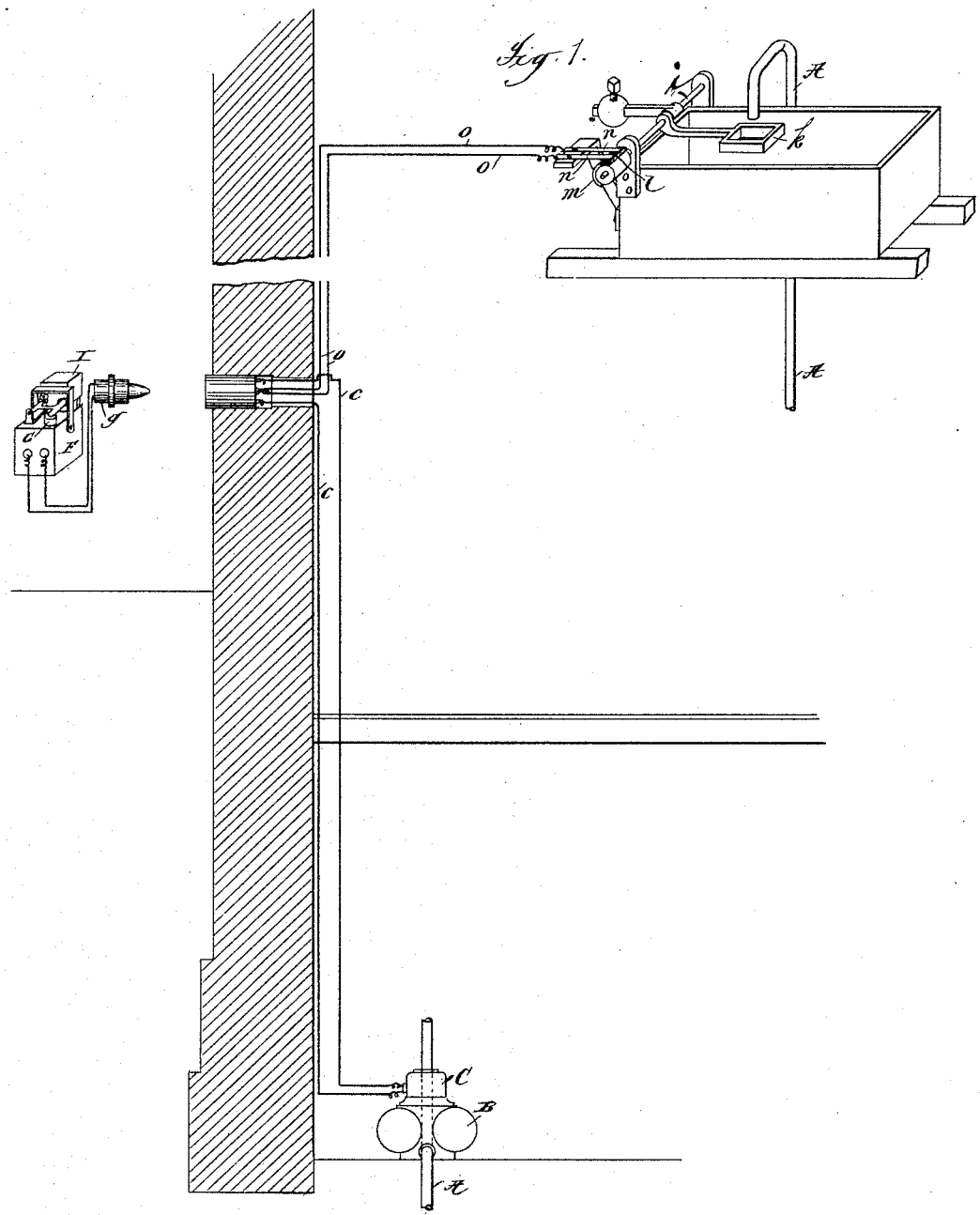

(No Model.) 3 Sheets—Sheet 1.

B. S. CHURCH.
APPARATUS FOR DETECTING WASTE OF WATER.

No. 428,075. Patented May 20, 1890.

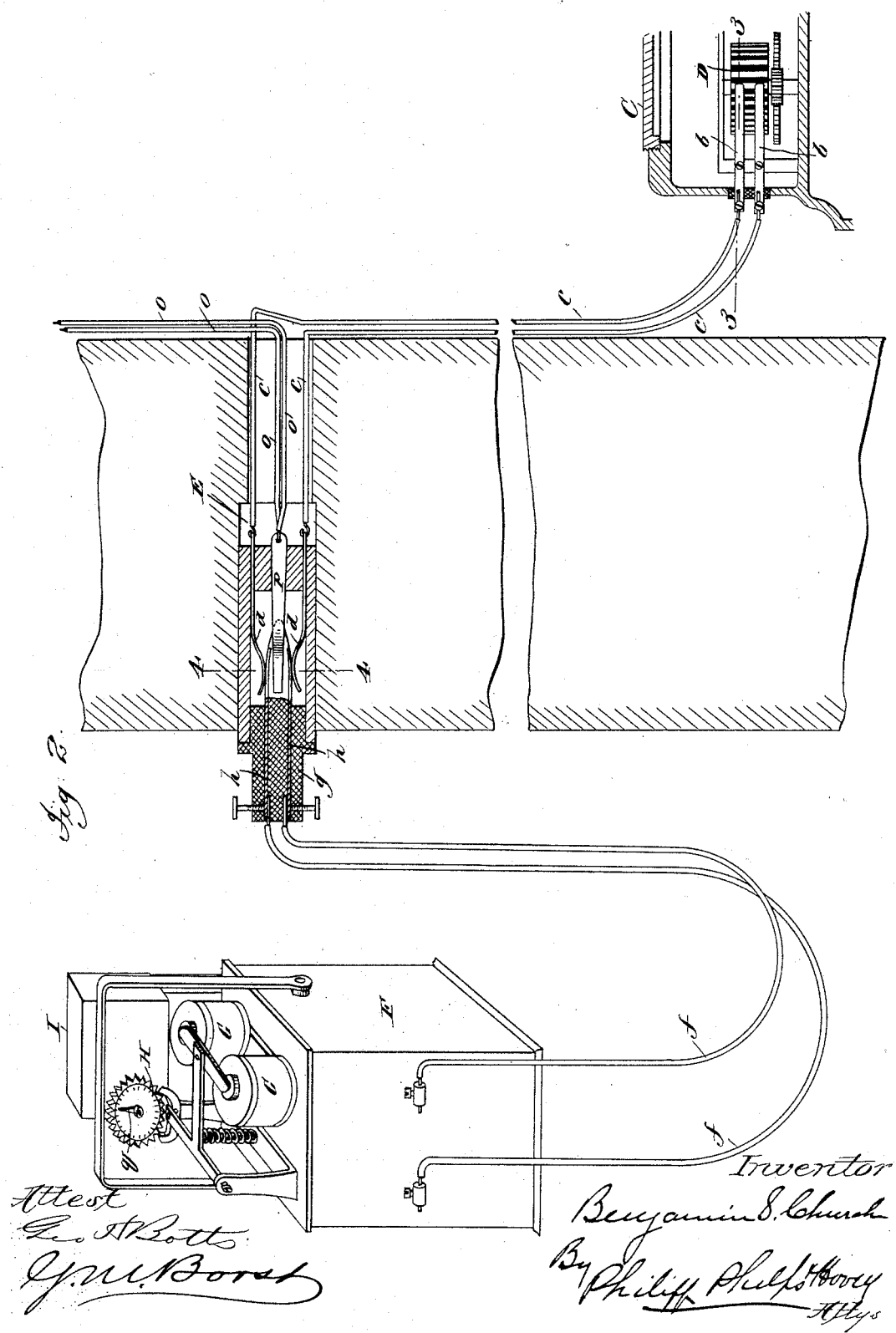

(No Model.) 3 Sheets—Sheet 3.
B. S. CHURCH.
APPARATUS FOR DETECTING WASTE OF WATER.
No. 428,075. Patented May 20, 1890.
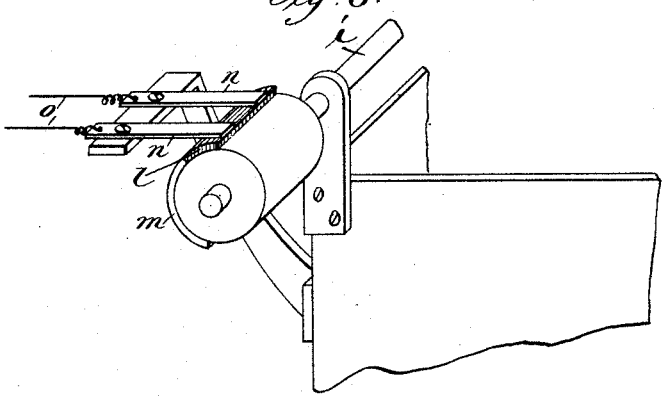
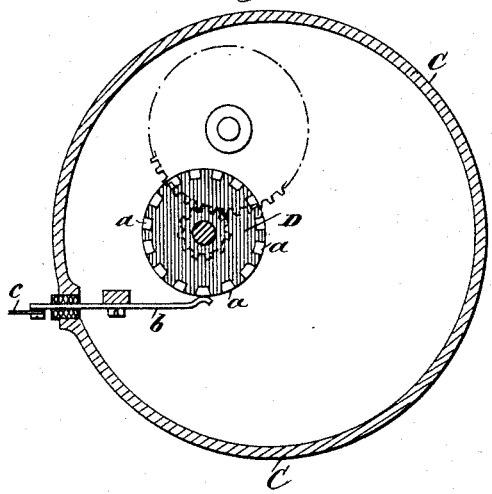
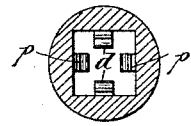
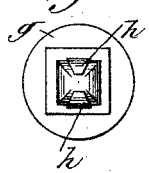

UNITED STATES PATENT OFFICE.

BENJAMIN S. CHURCH, OF NEW YORK, N. Y.

APPARATUS FOR DETECTING WASTE OF WATER.

SPECIFICATION forming part of Letters Patent No. 428,075, dated May 20, 1890.

Application filed September 21, 1889. Serial No. 324,602. (No model.)

*To all whom it may concern:*

Be it known that I, BENJAMIN S. CHURCH, a citizen of the United States, residing at New York, county of New York, and State of New York, have invented certain new and useful Improvements in Apparatus for Detecting Waste of Water, fully described and represented in the following specification and the accompanying drawings, forming a part of the same.

In those cities and towns which are supplied with water through a system of mains and service-pipes it is often of the highest importance to determine whether consumers are in the habit of allowing water to run when it is not required. In many cases it has been found necessary or desirable to provide the water-distribution system with meters by which the water of each consumer is measured, so that in case of unnecessary consumption the city or town or water company, as the case may be, will be reimbursed for the water wasted. There are many cases, however, in which it is highly important to prevent unnecessary waste of water, even though the water so wasted is paid for, because in many cases the supply is only equal or about equal to the legitimate demands upon it, and any waste is liable to create a shortage which would cause inconvenience and possible danger.

It is the object of the present invention to provide a simple apparatus for use to detect waste of water and the amount of such waste in those cases where meters are employed.

My apparatus is, briefly stated, organized as follows: As the waste of water almost invariably occurs late at night—say after twelve o'clock—it is of course necessary that whatever apparatus is employed for detecting it should be so organized that the inspector will be able to ascertain whether or not it is taking place without entering the building which is being inspected. For this purpose I provide the water-meter, which is usually located in the basement or cellar of the building, with an electric circuit maker and breaker, which is operated by some moving part of the meter, usually the shaft which operates the registering mechanism with which the meter is always provided, and which is connected to two conductors, which pass through the wall of the building and terminate in suitable contact-plates located at some convenient position which is readily accessible to the inspector from the outside of the building. These plates will of course be suitably protected, preferably by being located in a recess or countersink in the wall, which can be closed by a plug or cap. The inspector is provided with a suitable portable battery having an indicating apparatus, which will usually consist of an ordinary telegraph-sounder, but may be of other form. The battery is also provided with two conductors, which terminate in suitable contact-plates, preferably embedded in a plug, which is so formed that it can readily be placed in position to connect the terminals of the two conductors of the battery with the terminals of the two conductors connected to the circuit maker and breaker of the meter, thus establishing an electric circuit through the battery and its indicator. It will be readily seen that if water is flowing through the service-pipe the meter will operate, and the rapidity with which the meter operates will indicate the amount of water flowing. As the meter operates, the circuit maker and breaker with which it is provided will be operated to make and break the circuit which is established through the battery and its indicator periodically, and each make and break of the circuit will be indicated by the indicator. By then consulting the indicator the amount of water which is being wasted can readily be determined. In many cases the head of the water-supply is not sufficient, when being drawn upon to any considerable extent, to carry the water to the upper floors of many buildings, while, on the other hand, when little or no water is being drawn, the head increases so as to be sufficient to carry the water to the tops of such buildings, and in such cases it is customary to provide tanks upon the upper floors or roofs of such buildings, which will be filled during the night, when little or no water is being drawn, and which will then afford a supply for the upper floors of the buildings during the following day. In cases of this kind it is desirable to provide any waste-indicating apparatus with means by which it can be determined, in case water is found to be flowing through the meter, whether such water is flowing into the tank or being wasted. To accomplish this I provide the tank with a circuit maker and breaker for each tank, the position of which is controlled by the stream of water flowing into the tank in such manner that when water is flowing into the tank the circuit will be closed at that point, while, on the other hand, when no water is flowing into the tank, the circuit will be open at that point, or vice versa. This circuit maker and breaker is connected to two conductors, which terminate in position to be accessible from the outside of the building, the same as the conductors leading from the meter, and preferably they terminate in the same recess in the wall of the building and in such position that contact can readily be made between them and the two conductors connected to the battery. By this means the inspector, after determining whether or not water is flowing, has only to disconnect his battery from the meter and connect it to the conductors leading to the tank. If the water is flowing into the tank, the circuit will be permanently closed through the battery and the indicator, while, on the other hand, if the water is not flowing into the tank, the circuit through the battery and the indicator will not be closed, or vice versa.

In the accompanying drawings, Figure 1 is a diagrammatic elevation illustrating the application of my system of detecting the waste of water. Fig. 2 is an enlarged section showing the connections between the meter and a portable battery and indicator, and showing also a perspective view of said battery and indicator. Fig. 3 is a section taken on the line 3 of Fig. 2. Fig. 4 is a section taken on the line 4 of Fig. 2, showing the battery disconnected. Fig. 5 is an end view of the plug carrying the terminals of the battery-conductors. Fig. 6 is an enlarged perspective view of the circuit maker and breaker located at the tank.

Referring to said drawings, it is to be understood that A represents the service-pipe of the building, or it may be a number of buildings, which are supplied through a single meter B. The meter B, as here indicated, is of the well-known Worthington type; but it is to be understood that it may be of any of the common forms, or of any form that will measure the water flowing through the pipe A. The meter B is provided with the usual counting or registering mechanism C. Upon any suitable moving part of the meter, but preferably upon one of the shafts of the counting mechanism, there is mounted a disk D, of insulating material, which is provided round its periphery with recesses, in which are seated metallic contact-plates $a$. Located in a position to rest upon the periphery of the disk D as it is revolved by the operation of the meter are a pair of spring contact-plates $b$, which as the disk revolves alternately make contact with the pieces $a$ and with the non-conducting periphery of the disk, thus constituting a circuit maker and breaker, which is so timed as to make and break an electric circuit, as will be presently explained, at such times having special relation to the meter that each make and break will indicate the flow of a given quantity of water through the meter. The contacts $b$ are connected to wires or other electrical conductors $c$, which terminate in a recess or cavity E in the wall of the building, where they are connected to insulated contact-plates $d$, which are readily accessible from the outside of the building.

Co-operating with and forming part of the system which has just been described is a small portable battery F, provided with an indicating apparatus G. The battery F is of suitable size and construction to be conveniently carried by the inspector from house to house, and the indicating apparatus is so connected to the battery that when the circuit is closed through the latter the indicator will be in said circuit.

The indicating apparatus G may be of a variety of forms, but will preferably consist, as shown in the present case, simply of a telegraph-sounder. The battery is provided with two wires or conductors $f$, which terminate in a plug $g$, of insulating material, and are connected to two contact-plates $h$, which project at the sides of the plug, so that when the latter is inserted into the recess E they will make contact with the plates $d$, and thus close the circuit at that point through the battery and the indicator.

The operation of the apparatus thus far described is as follows: The inspector in making his rounds simply removes the cap or plug with which the recess E will ordinarily be closed, and inserts the plug $g$ into said recess in proper position for the plates $h$ to make contact with the plates $d$. If water is flowing through the service-pipe A, the disk D will be rotated, the speed of rotation being determined by the amount of water flowing through the pipe. As the disk is rotated it will make and break the circuit through the wires $c\ f$, and the sounder will indicate each make and break, and by counting the number of makes and breaks for a given time the inspector can determine the amount of water flowing through the pipe. If no water is flowing through the pipe, the circuit through the wires $c\ f$ will remain either permanently closed or permanently broken, according to the position of the disk D, and consequently the sounder will not be operated and the inspector will know that no water is being wasted. In case the house is provided with a tank or tanks, as before explained, it is necessary that the inspector should be able to determine, in case he finds water flowing in the pipe A, whether it is flowing into a tank or is going to waste. Each tank is therefore provided with a rock-shaft $i$, having an arm which terminates in a cup $k$ directly beneath the opening of the pipe which supplies the tank, and is counterbalanced, so as to normally be maintained in a horizontal position. As soon, however, as water commences to flow into the tank the cup will be filled, and will therefore fall by its weight and rock the shaft $i$. The shaft $i$ is provided with a circuit maker and breaker consisting of a piece of insulating material $l$ and a metallic contact-plate $m$. Located so as to rest upon the piece of insulating material $l$ when the shaft is in its normal position are a pair of spring contact-plates $n$, which are connected to wires or conductors $o$, which terminate in the recess E and are connected to a pair of contact-plates $p$, similar to the plates $d$, but arranged to alternate therewith. From this it will be seen that so long as no water is flowing into the tank the circuit through the wires $o$ will remain permanently broken at the tank, but that as soon as water commences to flow into the tank the cup $k$ will be rocked downward, so as to close the circuit through the wires $o$ at that point. If, therefore, the inspector finds water flowing through the pipe A, he withdraws the plug $g$ and gives it a quarter-turn and reinserts it in the recess E, so that the plates $h$ make contact with the plates $p$. If the water is flowing into the tank, the circuit through the battery and the indicator will be permanently closed, and the inspector will know that the water is flowing into the tank and that it is not being wasted. If, on the other hand, the water is not flowing into the tank, the circuit will not be closed at the tank, and consequently will not be closed through the battery and indicator, and this will indicate to the inspector that the water is being wasted. Of course the circuit through the wires $o$ may be broken by the falling of the cup $k$ instead of being closed, and if the house is provided with more than one tank each tank may be provided with a circuit-maker connected to the wires $o$. The cup $k$ will of course be provided with a vent, which will permit the water to slowly leak out of it, so as to permit it to be restored to its horizontal position after the water has ceased to flow into the tank.

If desired, the sounder may be provided with an escapement H, as indicated in Fig. 2, which will be connected to an ordinary clock mechanism contained in the box 1, and will be controlled by the armature of the sounder. This escapement being provided with a pointer $q$ and scale, the amount of water flowing through the pipe A will be registered. In some cases it may be desired to provide this auxiliary apparatus to enable the inspector to verify his record taken from the sounder; but usually it will not be necessary.

What I claim is—

1. The combination, with a water-supply pipe and a meter located therein, of a circuit maker and breaker operated by the meter, electric conductors connected to said circuit maker and breaker and terminating at a point accessible from the outside of the building in which the meter is located, and a portable battery and indicator having electric conductors adapted to be connected and disconnected to and from said first conductors, substantially as described.

2. The combination, with a water-supply pipe and a meter located therein, of a circuit maker and breaker operated by the meter, electric conductors connected to said circuit maker and breaker and terminating at a point accessible from the outside of the building in which the meter is located, an elevated tank supplied with water from said service-pipe, a circuit maker and breaker operated by the water flowing into the tank, and electric conductors connected to said circuit maker and breaker and terminating at a point accessible from the outside of the building in which the meter is located, substantially as described.

In testimony whereof I have hereunto set my hand in the presence of two subscribing witnesses.

BENJAMIN S. CHURCH.

Witnesses:
T. H. PALMER,
G. M. BORST.